(12) United States Patent
Deffler et al.

(10) Patent No.: US 6,601,023 B1
(45) Date of Patent: Jul. 29, 2003

(54) METHOD FOR IMPACT ANALYSIS OF A MODEL

(75) Inventors: Tad A. Deffler, Boonton, NJ (US); Mark Russo, Belle Mead, NJ (US); Thomas R. Beerbower, Holland, PA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/419,731

(22) Filed: Oct. 16, 1999

Related U.S. Application Data
(60) Provisional application No. 60/104,682, filed on Oct. 16, 1998.

(51) Int. Cl.[7] .............................. G06F 3/11; G06F 17/30
(52) U.S. Cl. ............................. 703/13; 703/22; 707/6; 707/103
(58) Field of Search .............................. 703/14, 15, 16, 703/13, 22; 700/83, 86, 9; 707/3, 6, 103, 104; 717/108

(56) References Cited

U.S. PATENT DOCUMENTS

| 5,257,363 | A | * | 10/1993 | Shapiro et al. | ............. | 395/500 |
| 5,717,924 | A | | 2/1998 | Kawai | | |
| 5,732,192 | A | * | 3/1998 | Malin et al. | ............. | 395/10 |
| 5,764,978 | A | | 6/1998 | Masumoto | ............. | 395/611 |
| 5,768,586 | A | | 6/1998 | Zweben et al. | | |
| 5,794,229 | A | | 8/1998 | French et al. | ............. | 707/2 |
| 5,802,511 | A | | 9/1998 | Kouchi et al. | ............. | 707/2 |
| 5,822,750 | A | | 10/1998 | Jou et al. | ............. | 707/2 |
| 5,974,201 | A | * | 10/1999 | Chang et al. | ............. | 382/305 |
| 5,978,789 | A | * | 11/1999 | Griffin et al. | ............. | 707/2 |
| 6,112,304 | A | * | 8/2000 | Clawson | ............. | 713/156 |
| 6,292,811 | B1 | * | 9/2001 | Clancey et al. | ............. | 707/503 |
| 6,385,610 | B1 | * | 5/2002 | Deffler et al. | ............. | 707/6 |

OTHER PUBLICATIONS

E. Kantorowitz, Software Practice & Experience, John Wiley & Sons Ltd. Chichester, GB, "Algorithm Simplification Through Object Orientation", Software—Practice and Experience, Feb. 1, 1997, pp. 173–183, vol. 27, No. 2.

Ying Yang, "Change Management In Object–Oriented Databases", Proceedings of the International Phoenix Conference on Computers and Communications, Mar. 23, 1993, pp. 238–244, vol. CONF. 12, N.Y., IEEE, US.

B.P. Douglass, "Designing Real–Time Systems with the Unified Modeling Language", Electronic Design, Penton Publishing, Cleveland, OH, US, Sep. 15, 1997, pp. 132, 134, 136, vol. 45, No. 20.

"Logic Works Releases Beta of Object–Relational Modeling Tool for Universal Server Databases", www.microway.com/au/press/logic_umabeta.htm, Informix Worldwide User Conference, San Francisco, CA, Jul. 22, 1997.

* cited by examiner

Primary Examiner—Samuel Broda
Assistant Examiner—Thai Phan
(74) Attorney, Agent, or Firm—Baker & McKenzie

(57) ABSTRACT

A method for determining the net change to a model as a result of a transaction. The method includes receiving a request for a net change of a model as a result of a transaction. The method also includes identifying a plurality of model change records associated with the transaction. The method also includes determining and displaying net change of the model based on each of the plurality of model change records associated with the transaction.

8 Claims, 11 Drawing Sheets

FIG. 10

|   | A | B | C | D | E |
|---|---|---|---|---|---|
| a |   | <NOT IN DELTA LOCATION> | ADD | UPDATE | DELETE |
| b | ADD | RECORD "ADD" IN DELTA LOCATION | RECORD ACTION AS "INVALID" IN DELTA LOCATION | RECORD ACTION AS "INVALID" IN DELTA LOCATION | RECORD ACTION AS "INVALID" IN DELTA LOCATION |
| c | UPDATE | RECORD "UPDATE" IN DELTA LOCATION | MAINTAIN PRIOR-ACTION TYPE "ADD" IN DELTA LOCATION | RECORD ACTION AS "INVALID" IN DELTA LOCATION | RECORD ACTION AS "INVALID" IN DELTA LOCATION |
| d | DELETE | RECORD "UPDATE" IN DELTA LOCATION | REMOVE PRIOR-ACTION TYPE FROM DELTA LOCATION | RECORD "DELETE" IN DELTA LOCATION | RECORD ACTION AS "INVALID" IN DELTA LOCATION |

FIG. 12

|   | V | W | X | Y | Z |
|---|---|---|---|---|---|
| v |   | <NOT IN DELTA LOCATION> | ADD | UPDATE | DELETE |
| w | ADD | RECORD POST-IMAGE | RECORD ACTION AS "INVALID" IN DELTA LOCATION | RECORD ACTION AS "INVALID" IN DELTA LOCATION | RECORD ACTION AS "INVALID" IN DELTA LOCATION |
| x | UPDATE | RECORD PRE-IMAGE AND POST-IMAGE | RECORD PRE-IMAGE AND POST-IMAGE | REPLACE THE PREVIOUS PRE-IMAGE AND POST-IMAGE. IF NEW PRE-IMAGE AND POST-IMAGE ARE EQUAL, REMOVE THEM FROM DELTA | RECORD ACTION AS "INVALID" IN DELTA LOCATION |
| y | DELETE | RECORD PRE-IMAGE | REMOVE PREVIOUS IMAGES FROM DELTA LOCATION | RECORD PRE-IMAGE IF NOT ALREADY IN DELTA LOCATION. DISCARD PREVIOUS POST-IMAGE | RECORD ACTION AS "INVALID" IN DELTA LOCATION |

US 6,601,023 B1

METHOD FOR IMPACT ANALYSIS OF A MODEL

CROSS-REFERENCE TO RELATED APPLICATIONS

The present application claims benefit of the filing date of U.S. Provisional Application No. 60/104,682 entitled MODELING TOOL SYSTEMS AND METHODS, filed on Oct. 16, 1998, incorporated by reference herein in its entirety.

The present application is related to a co-pending U.S. patent application Ser. No. 09/420,223 entitled APPARATUS AND METHOD FOR MODELING TOOLS, being concurrently filed on the same day, which is incorporated by reference herein in its entirety.

The present application is related to co-pending U.S. patent application Ser. No. 09/419,736 entitled METHOD FOR DETERMINING DIFFERENCES BETWEEN TWO OR MORE MODELS, being concurrently filed on the same day, which is incorporated by reference herein in its entirety now U.S. Pat. No. 6,385,610.

The present application is related to co-pending U.S. patent application Ser. No. 09/419,749 entitled METHOD AND SYSTEM FOR AN EXTENSIBLE MACRO LANGUAGE, being concurrently filed on the same day, which is incorporated by reference herein in its entirety.

The present application is related to co-pending U.S. patent application Ser. No. 09/418,751 entitled METHOD AND APPARATUS FOR PROVIDING ACCESS TO A HIERARCHICAL DATA STORE THROUGH AN SQL INPUT, being concurrently filed on the same day, which is incorporated by reference herein in its entirety.

FIELD OF THE INVENTION

The present invention relates to impact analysis of a model, in particular to impact analysis of an object/property model of a Universal Modeling Architecture-based application.

BACKGROUND OF THE INFORMATION

Modeling applications include models that interact with other component of the application. A modeling application such as Universal Modeling Architecture(UMA)-based application includes an object/property model. An example of another component of the UMA-based application is semantics. The semantics are extensible, thus a predictive code that describes changes to the object/property model as a result of a transaction regardless of the source cannot be implemented. Real-time impact analysis requires, however, that changes to the object/property model for a respective transaction be determined and summarized. Accordingly, a need exists for a method for determining the impact changes of a model to other components that communicate or are affected by the model.

SUMMARY OF THE INVENTION

An aspect of the present invention is a method for determining the net change to a model as a result of a transaction. The method includes receiving a request for a net change of a model as a result of a transaction. The method also includes identifying a plurality of model change records associated with the transaction. The method also includes determining and displaying the net change of the model based on each of the plurality of model change records associated with the transaction.

BRIEF DESCRIPTION OF THE DRAWINGS

FIG. 10 illustrates an exemplary set of rules for determining the net action type change from the model change records of a transaction of the present invention.

FIG. 12 illustrates an exemplary set of rules for determining the net data change from the model change records of a transaction of the present invention.

DETAILED DESCRIPTION

Figure 1:
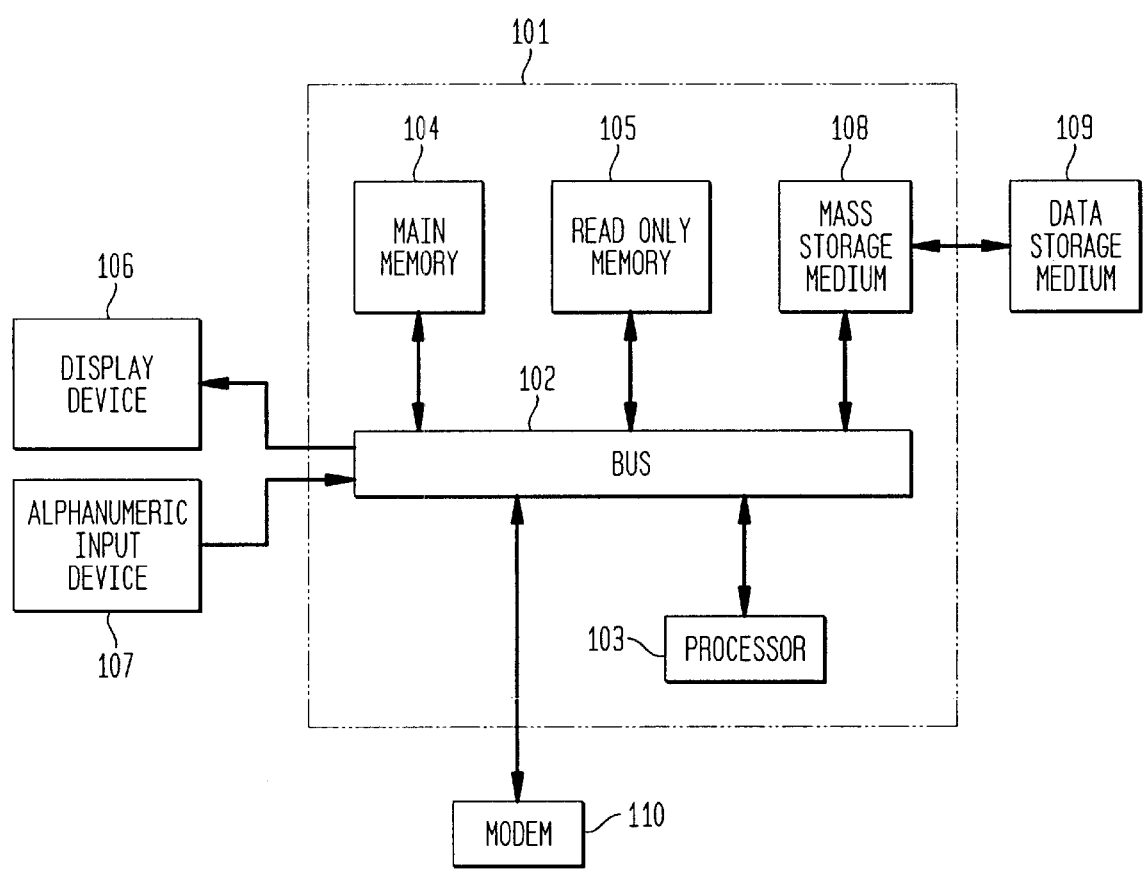
FIG. 1 illustrates a functional block diagram of an conventional computer system.

FIG. 1 illustrates a conventional computer system 101 in which the present invention operates. In an exemplary embodiment, the present invention is implemented, for example, on a SUN™ Workstation manufactured by SUN MICROSYSTEMS™. Alternate embodiments may be implemented, for example, on an IBM™ Personal Computer manufactured by IBM Corporation or a MACINTOSH™ computer manufactured by APPLE™ Computer. It will be apparent to those of ordinary skill in the art that other computer system architectures may also be employed. In general, such computer systems as illustrated by FIG. 1 include a bus 102 for communicating information, a processor 103 such as a central processing unit coupled to the bus 102 for processing information, and a main memory 104 coupled to the bus 102 for storing information and instructions for the processor 103. A read-only memory 105 is coupled to the bus 102 for storing static information and instructions for the processor 103. A display device 106 coupled to the bus 102 displays information, for example, for a developer.

An alphanumeric input device 107, such as a key board, is coupled to the bus 102 and communicates information and command selections to the processor 103. A modem 110 is coupled to the bus 102 and provides communication with, for example, other computer systems or databases and a mass storage medium 108, such as a magnetic disk and associated disk drive coupled to the bus 102 for storing information and instructions. A data storage medium 109 containing digital information is configured, for example, to operate with a mass storage medium 108 to allow processor 103 access to the digital information on data storage medium 109 via bus 102. In addition, a CD-ROM drive (not shown) may also be used for the storage of high resolution images for display on the display device 106.

An embodiment of the present invention is implemented, for example, as a software module written in the C++ programming language which may be executed on a computer system such as computer system 101 in a conventional manner. Using well known techniques, the application software may be stored on data storage medium 109 and subsequently loaded into and executed within the computer system 101. Once initiated, the software of the preferred embodiment operates, for example, in the manner described below. Universal Modeling Architecture (UMA) is a data-driven modeling engine that could work in various problem domains based on an external definition of a meta model that may be provided by a developer and be extended to provide an UMA-based product. An external definition of a meta model is, for example, a series of descriptions of the types of objects that are to be found in the problem domain, and the properties associated with each of these objects. These descriptions may be provided by invoking a set of functions exposed by the implementation, and passing in, via function parameters, the descriptive information. Exemplary problem domains may include: data modeling such as database tables, columns and indices; process modeling such as activities and arrows; access modeling such as data manipulation language statements and files; and component modeling such as interfaces, implementations, and dependencies.

In an exemplary embodiment of the present invention, the UMA-based product is a modeling tool. The UMA-based product may be an UMA-based application such as a user interface that includes UMA. The UMA-based product may also include an instance of an object/property model based on an external definition of the meta model provided by, for example, a developer.

Figure 2:
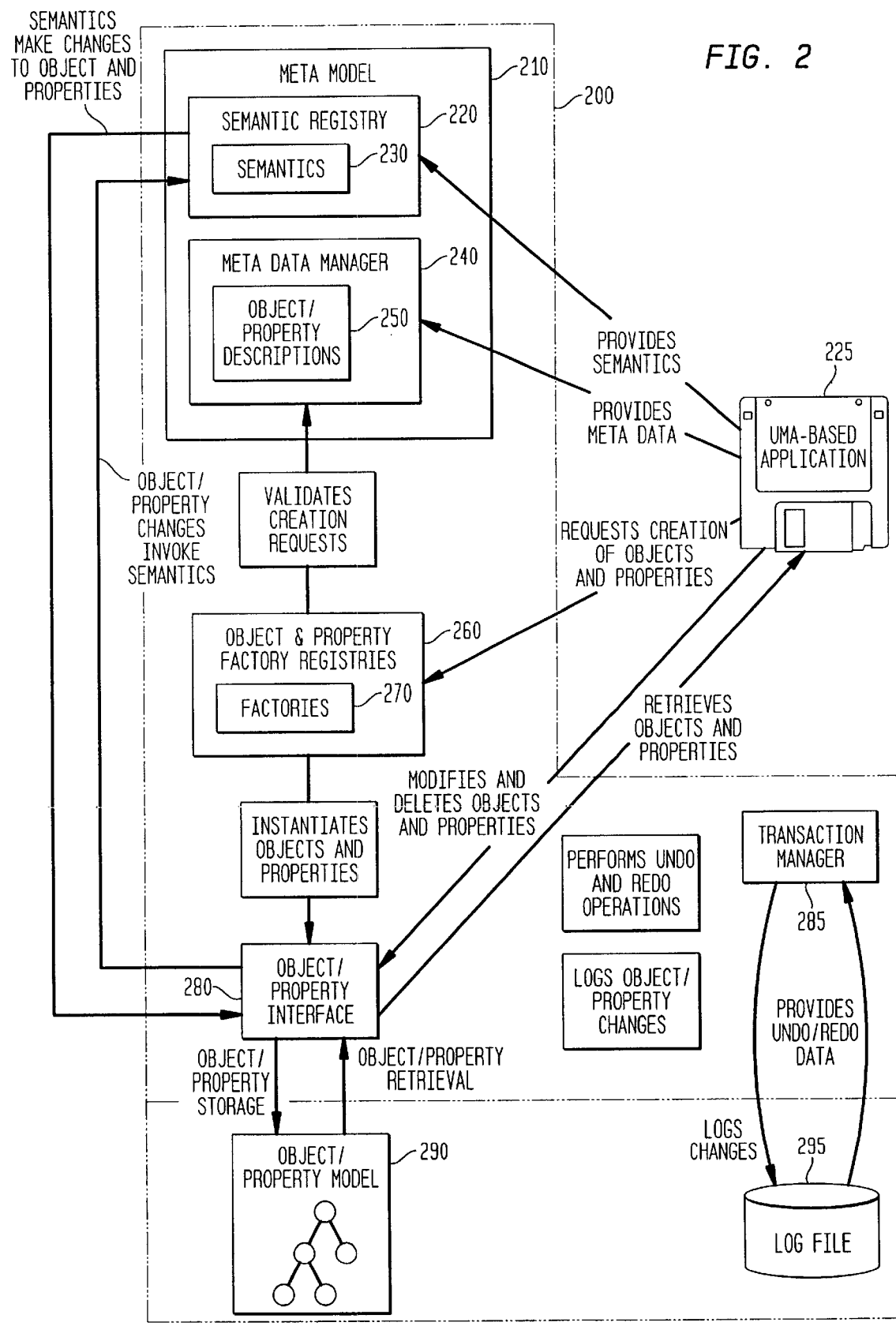
FIG. 2 illustrates a functional block diagram of an exemplary embodiment of the present invention.

In an exemplary embodiment of the present invention, as shown in FIG. 2, UMA 200 includes a meta model 210, object and property factory registries 260, object/property interface 280, transaction manager 285, log file 295, and object/property model 290. The meta. model 210 may include a semantic registry 220 including a plurality of sets of semantics 230 and a meta data manager 240 including object/property descriptions 250. The object/property descriptions 250 are sets of information describing the characteristics of an object or a property. In the case of objects, this may include its name, a human-readable piece of descriptive text, generalization information, information about what other types of objects may be contained within it. Generalization information, for example, describes refinement/subtyping such as synonyms information.

Object/property descriptions may be provided by the developer or user as the externally defined meta model. The meta model 210 is a description of the objects and properties of the problem domain to be solved and a plurality of sets of semantics 230 to be respectively invoked to change objects and properties when changes to such objects and properties are requested.

Figure 3:
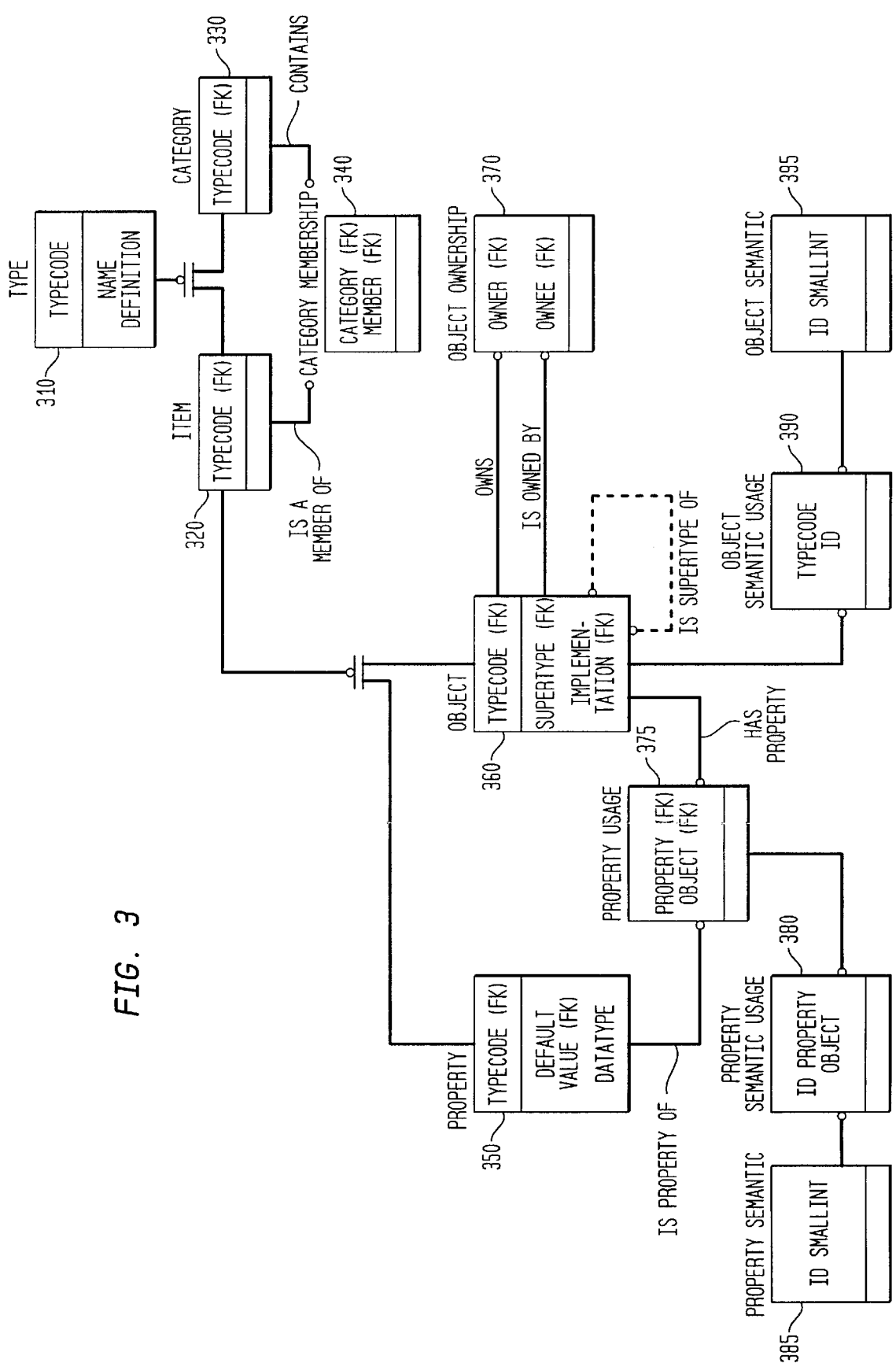
FIG. 3 illustrates a data model of an exemplary embodiment of a meta model of the present invention.

FIG. 3 shows an exemplary embodiment of meta model 210 of the present invention. As shown in FIG. 3, the meta model 210 includes a plurality of classes such as objects, properties and semantics and establishes relationships between objects, properties and semantics. Type 310 is associated with a type code key, name attribute and definition attribute. Type 310 can be, for example, a category 330 or an item 320. Category 330 is associated with a type code key and includes a plurality of items. Category membership 340 is associated with a category key and member key. Item 320 is associated with a type code key and can be a property or object.

Property 350 is associated with a type code key, default value attribute and datatype attribute. Property 350 is also associated with property usage 375. Object 360 is associated with a type code key, object implementation attribute, and supertype attribute. A supertype attribute provides further specificity to the object 360. Object 360 may own (e.g., include as a component) and be owned by other objects. Object ownership 370 is associated with owner key and ownees key. Property usage 375 is associated with property key and object key.

Property usage 375 also associates the property 350 with the object 360. Object semantic usage 390 is associated with a type code key and identification (ID) key. Object semantic usage 390 associates object 360 with object semantic 395. The object semantic 395 is associated with an ID key. Property semantic usage 380 is associated with an ID key, property key and object key. Property semantic usage 390 associates property semantic 385 with property usage 375. Property semantic 385 is associated with an ID key.

As shown in FIG. 2, the meta data manager 240 of the meta model 210 receives meta data (e.g., description of objects and properties), for example, from a developer through an UMA-based application 225. The meta data is what are the objects and properties provided by a developer to solve the problem domain of the developer. The meta data manager 240 receives validation creation requests from object and property factory registries 260.

As shown in FIG. 2, the semantic registry 220 of the meta model 210 includes a plurality of sets of semantics 230 which may include, for example, a predefined set and additional sets provided by the developer through an UMA-based application. Semantics 230 are modeling rules encapsulated in semantic objects that expose an interface, such as a pure virtual class, that hide the modeling engine from details of the semantics 230. The predefined semantic set provides rules to enforce the integrity of the underlying modeling engine and in an exemplary embodiment of the present invention, the predefined semantic set cannot be changed by a developer. The additional sets of semantics provided by the developer can be modified by the developer. An example of a semantic may be, for example, one that enforces the rule "No two columns in a single database table may have the same name."

Semantics 230 gain access to object/property model 290 through object/property interface 280. The semantic registry 220 may include an object semantic registry for determining if a specific set of object semantics exist and, if so, locating respective sets of object semantics. The semantic registry 220 may also include a property semantic registry for determining if a specific set of property semantics exist and, if so, locating the respective set of property semantics. The semantic registry 220 locates the respective set of semantics requested, for example, by object/property interface 280. The semantic registry 220 makes changes to the respective objects and properties in accordance with the semantics invoked and provides the changed objects and properties to object/property interface 280. The semantic registry 220 also provides the status of an action of a transaction to the object/property interface 280. For example, one of the semantics invoked for an action may be violated and, thus, indicate that the action has failed.

Object and property factory registries 260 may include factories 270 such as object factories and property factories, respectively. The object and property factory registries 260 receive requests for the creation of objects and properties, for example, from a developer through an UMA-based application 225. The factories 270 create objects and properties. The object and property factory registries 260 determine if a specific factory exists and, if so, locate the respective factory to create the respective object or property being requested. The object and property factory registries 260 also provide a validation creation request to the meta data manager 240. The validation may include, for example, whether the creation of the object or property requested was successful. The object and property factory registries 260 instantiate objects and properties, respectively, and provide such objects and properties to object/property interface 280.

As shown in FIG. 2, object/property interface 280 receives requests for the modification and deletion of objects and properties, for example, by a developer through UMA-based application 225. Such requests invoke the respective semantics in meta model 210 which may result in changes to the objects and properties which are provided to object/property interface 280 from semantic registry 220 of meta model 210. The object/property interface 280 may identify a discrete event from a plurality of discrete events, for example, as shown in Table One, and determine that a semantic or set of semantics should be invoked. The discrete events indicate occurrences where object/property model 290 may be modified. In an exemplary embodiment of the present invention, authors of UMA may provide a plurality of discrete events.

TABLE ONE

| Constant | Description |
| --- | --- |
| PostCreation | An object is being created |
| PreDestruction | An object is being destroyed |
| PreEdit | A property is about to be created and/or modified |
| PostEdit | A property has just been created and/or modified |
| PreNull | A property is about to be destroyed |
| PreOwnerDestruction | The object owning a property is about to be destroyed |

The object/property interface 280 is provided with the status of an action of a transaction by semantic registry 220 based on the result of the respective set of semantics invoked. For example, if an action caused any one of the set of semantics invoked to be violated, semantic registry 220 may provide an indication that the action failed. If the action did not cause any one of the set of semantics to be violated, however, semantic registry 220 may provide an indication that the action was successful. The object/property interface 280 provides object and property changes to the transaction manager 285 and, if the object/property interface 280 determines that an action failed, it may provide an indication that the action failed to transaction manager 285. The object/property interface 280 also provides objects and properties to object/property model 290. The object/property 280 interface also retrieves objects and properties from object/property model 290, for example, to provide such objects and properties to an UMA-based application 225 if requested.

Figure 4:
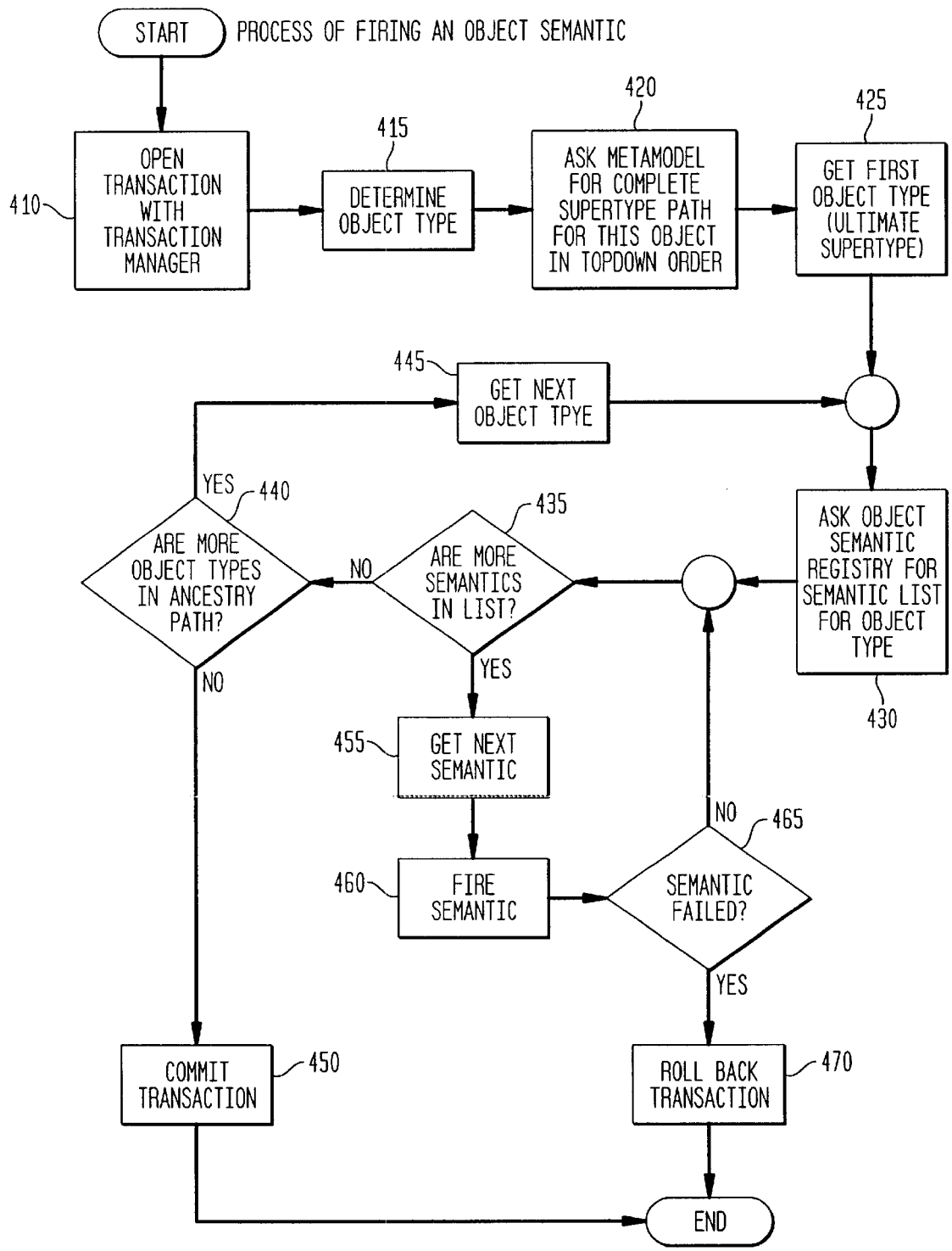
FIG. 4 illustrates a flow diagram of an exemplary embodiment of a method of firing an object semantic of the present invention.

FIG. 4, illustrates a flow diagram of an exemplary method of object/property interface 280 firing an object semantic. In 410, the object/property interface 280 opens transaction with transaction manager 285. A transaction is opened for each change to the model so that the change can be cancelled if found to be invalid. In 415, object/property interface 280 communicates with the object itself. All objects know their type to determine the object type. In 420, object/property interface 280 obtains the complete supertype path for a respective object from meta model 210, for example, in top-down order. In 425, the first object type (ultimate supertype) is obtained by object/property interface 280 from the metamodel. In 430, object/property interface 280 obtains the semantic list for the object type from object semantic registry 220. In 435, object/property interface 280 communicates with semantic registry 220 to determine whether more semantics are in the list. If yes, object/property interface 280 obtains, in 455, and fires, in 460, the next semantic. The object/property interface 280 determines, in 465, if the semantic failed. If so, in 470, the transaction is rolled back by the transaction manager 285 pursuant to a request from object/property interface 280. If, however, the semantic did not fail, in 435, object/property interface 280 will again determine whether any more semantics are in the list.

If no more semantics are in the list, in 440, object/property interface 280 will communicate with the metamodel and determine whether any more object types are in the ancestry path. If no, in 450, the transaction is committed. If there are more object types in the ancestry path, in 445, the next object type is obtained and object/property interface 280 again proceeds in 430 with obtaining the semantic list for object type from object semantic registry.

Figure 5:
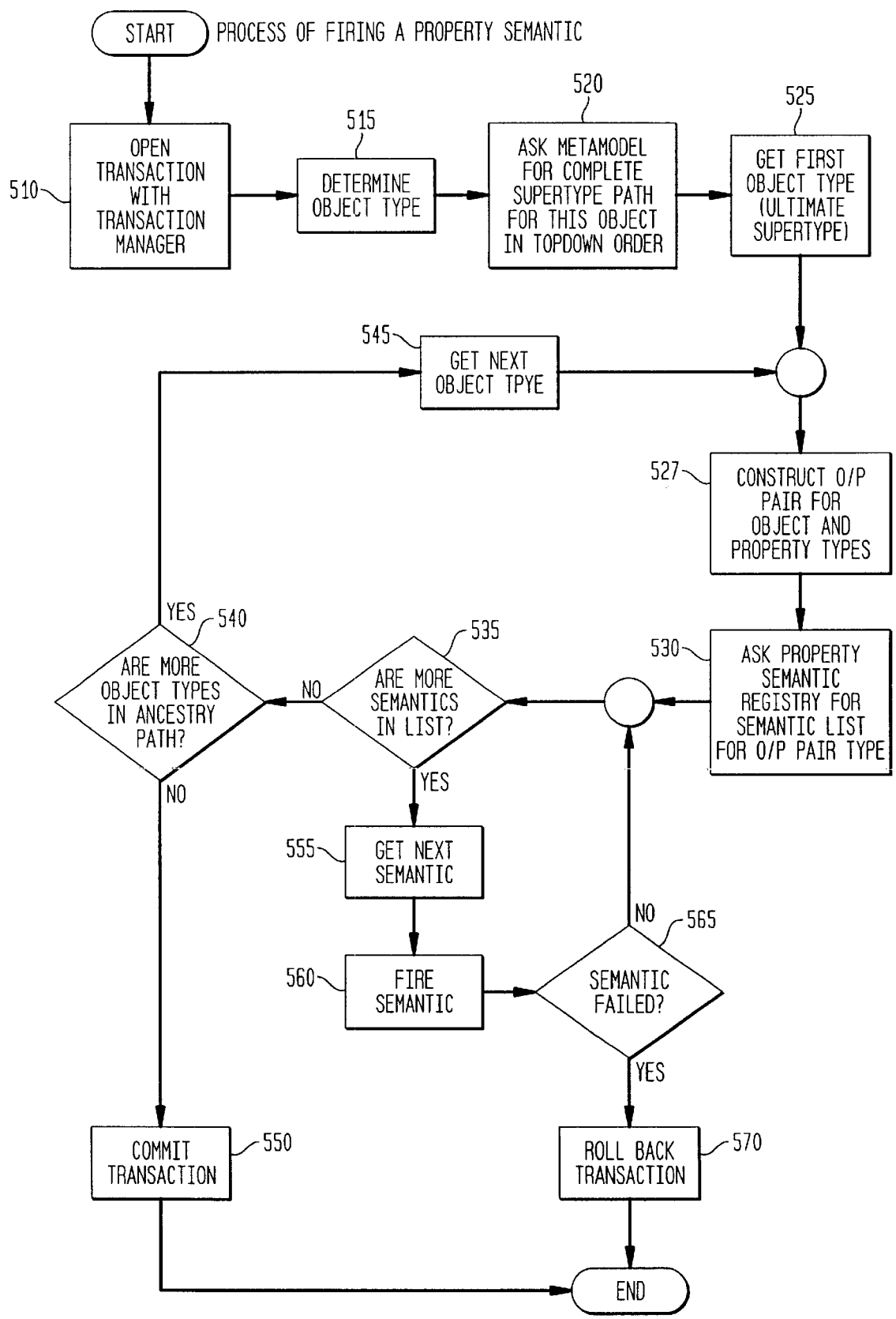
FIG. 5 illustrates a flow diagram of an exemplary embodiment of a method of firing a property semantic of the present invention.

FIG. 5 illustrates a flow diagram of an exemplary method of object/property interface 280 firing a property semantic. In 510, object/property interface 280 opens the transaction with transaction manager 285. In 515, object/property interface 280 communicates with the object to determine the object type. In 520, object/property interface 280 obtains the complete supertype path for the respective object from meta model 210, for example, in top-down order. In 525, the first object type (ultimate supertype) is obtained by object/property interface 280 from the metamodel. In 527, object/property interface 280 constructs an object/property pair for object and property types. In 530, object/property interface 280 obtains the semantic list for the object/property pair type from property semantic registry 530.

In 535, object/property interface 280 determines whether more semantics are in the list. If yes, in 555, object/property interface 280 obtains the next semantic and in 560 fires the next semantic. In 565, if object/property interface 280 determines that the semantic failed, in 570, the transaction is rolled back. If, however, the semantic did not fail, object/property interface 280 will return to 535 to determine whether any more semantics are in the list.

If no more semantics are in the list, in 540, object/property interface 280 will communicate with the metamodel and determine whether any more object types are in the ancestry path. If no, the transaction is committed in 550. If there are more object types in the ancestry path, in 545, the next object type is obtained and object/property interface 280 again proceeds with constructing an object property pair for object and property types in 527.

In an exemplary embodiment of the present invention, object/property model 290 includes a set of predefined objects and properties. The predefined set of objects and properties may be provided by, for example, the UMA developer to decrease the amount of work necessary for the developer of the product. The object/property model 290 also receives objects and properties from an object/property interface 280. The objects and properties received from the object/property interface are based on the external definition of the meta data provided by the developer. It is the objects and properties requested, for example, by a developer to be created and modified that are included in object/property model 290. Further, the object/property model 290 logs model changes to the transaction manager 285 through an object/property interface 280.

In an exemplary embodiment of the present invention, however, objects and properties in object/property model 290 that are a result of a failed action are removed from object/property model 290. Accordingly, in an exemplary embodiment of the present invention, objects and properties provided by a developer that remain in the object/property model 290 are the objects and properties that result from a successful action. Thus, a developer does not have direct access to and cannot directly change the object/property model 290. Consequently, changes to the model are known by the modeling engine and consistent and valid states can be assured at all times. If the developer had direct access to the underlying data structures, inappropriate changes may be made thereby creating invalid states in the model.

The transaction manager 285 places respective objects and properties in the state that they were in prior to being changed by a failed action. For example, the transaction manager 285 is provided with the indication that an action has failed by the object/property interface 280. Any action that fails is undone or wiped out. The transaction manager 285 may accomplish this, for example, by logging changes of object/property model 290 to log file 295, obtaining undo data from the log file 295, and performing an undo operation based on the success or failure of actions within a transaction as determined by object/property interface 280. Accordingly, object/property model 285 is maintained in a valid state. In an exemplary embodiment of the present invention, transaction manager 285 may also receive a request to undo or redo an action from UMA-based application 225. If a redo is being requested, transaction manager 285 may request redo information from log file 295 and perform the redo operation an a known manner.

Transactions may be provided by, for example, a developer through an UMA-based application 225 identifying the beginning and end of each of the respective transactions. Transactions include one or more actions, each of the actions may change the object/property model 290, for example, of an UMA-based application 225. The transaction manager 285 identifies the beginning of a transaction in the transaction log file 295, for example, by establishing a start position. In an exemplary embodiment of the present invention, the transaction manager 285 logs each action that changes the object/property model 290 of the transaction as a model change record in the transaction log file 295. The transaction manager 285 also identifies the end of a transaction in the transaction log file 295, for example, by establishing an end position. In an exemplary embodiment of the present invention, each of the start and end positions for the respective transactions may be stored in a location that can be searched to obtain where each of the respective transactions and their corresponding model change records are in the transaction log file 295. Accordingly, a transaction or plurality of transactions can be identified in the transaction log file 295. Thus, the net change of the object/property model 290 as a result of a transaction or plurality of transactions can be determined.

In an exemplary embodiment of the present invention, UMA may work in an access modeling problem domain such as data manipulation language statements (DML) and files. The object/property model 290, for example, may include as objects, Table A, Table B, DML statements such as SELECT A.x+B.y from A, B (where A is Table A, A.x refers to column x in Table A, B is Table B, and B.y refers to column y in Table B), and File C (a file that uses the SELECT A.x+B.y from A, B DML statement). These objects, for example, would be included in the object/property model 290. The semantics 230 of the meta model 210 would include, for example, semantics describing how changes to the object/property model 290 affects the respective DML statements. For example, semantic (1) may provide that the deletion of a table should cause all references to the table to be removed and surrounding syntax corrected from respective DML statements. Semantic (2) may provide that all objects in the object/property model 290 that represent files that use modified or deleted DML statements being designated as touched. A touched object or property is marked as logically modified even if no actual modification has occurred to it.

Providing a transaction to the object/property interface 280 that includes destruction of an object such as DELETE Table A is a discrete event (PreDestruction). Accordingly, the respective semantics will be invoked, for example, semantics (1) and (2). Consequently, pursuant to semantic (1), the contents of the object, SELECT A.x+B.y from A, B, is modified to SELECT B.y from B. Further, pursuant to semantic (2), the object containing File C is designated as being touched. Thus, the object/property model 290 is changed. As the semantics were successful, the changes are not rolled back. As a result of the DELETE Table A transaction, each of the actions: (1) Delete Table A, (2) the object containing, SELECT A.x+B.y from A, B, is modified to SELECT B.y from B, and (3) the object containing File C is designated as being touched, are included in the transaction log file 295 as model change records. Further, the beginning and end of the transaction is designated in the transaction log 295.

In an exemplary embodiment of the present invention, UMA 200 may further include an internal services component and an external services interface. The internal services component may include, for example, services or functions exposed to the developer to assist in the creation and manipulation of a model for solving the problem domain of the developer.

The external services interface is an interface which allows external services to communicate with UMA 200. The external services interface may be, for example, an object linking and embedding an add-in application program interface allowing third-party modules to extend the modeling capabilities of the tool, thus extending the modeling environment and the modeling rules to include functionality such as being automatically user-defined. Accordingly, the developer may have access to services beyond the services internal to UMA 200. External services may be, for example, a module for enforcing corporate naming standards upon all names entered by the user. Further, UMA 200 is scalable as the user interface such as UMA-based application 225 is separated from the semantics 230.

Figure 6:
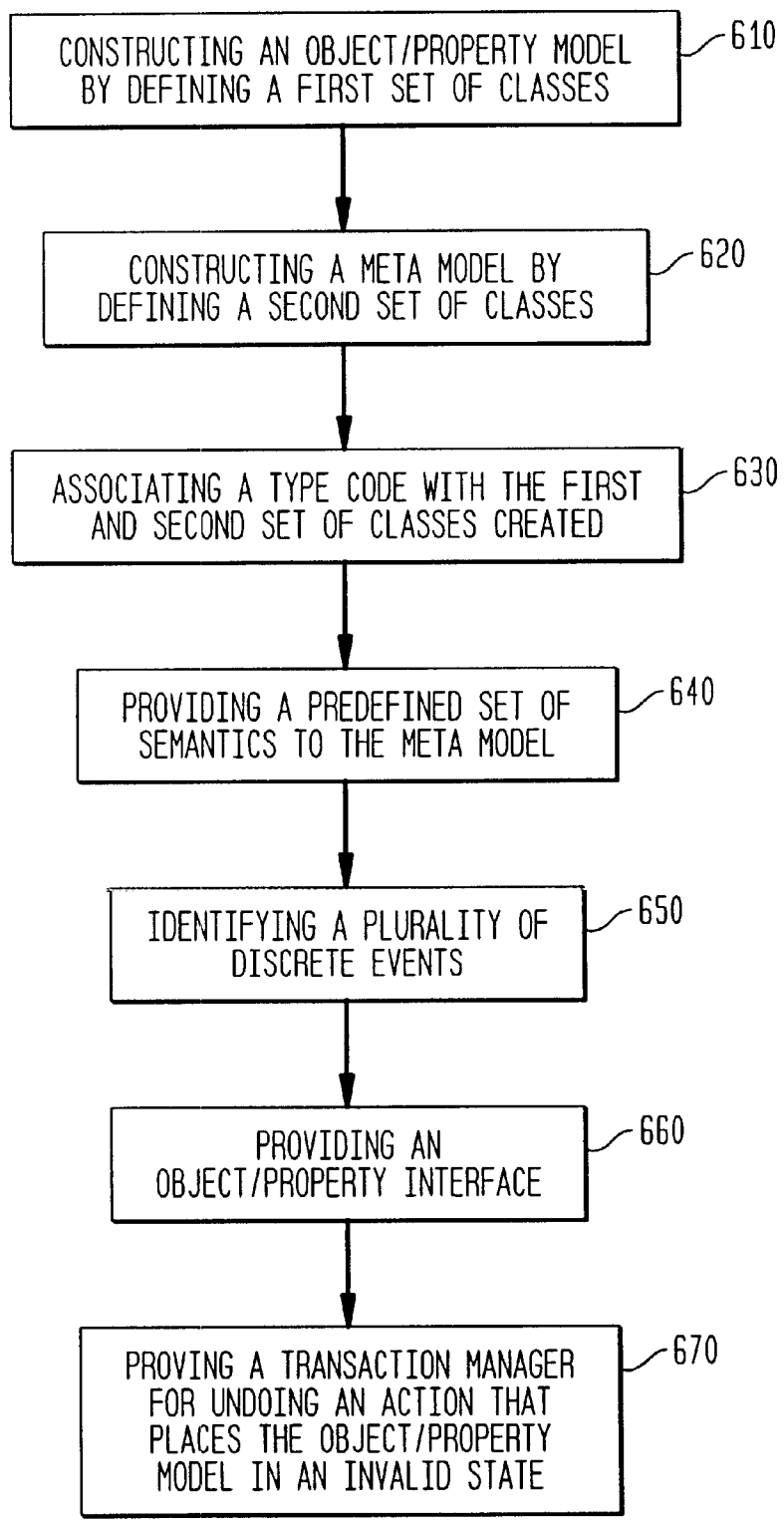
FIG. 6 illustrates a flow diagram of an exemplary embodiment of a method for building a modeling tool of the present invention.

An exemplary embodiment of a method for building modeling tools of the present invention is shown in FIG. 6. In 610, an object/property model 290 is constructed by defining a first set of classes for objects and properties provided by the developer as meta data. In an exemplary embodiment of the present invention, the object/property model 290 may include a predefined set of one or more objects and properties. The objects provide storage mechanisms for the properties that apply to it. In an exemplary embodiment of the present invention, an interface class for an object may be, for example, UMEObjectI. Properties may be implemented as a base class that requires programmer subclassing. In an exemplary embodiment of the present invention, the base class may provide administration services without data storage. In an exemplary embodiment of the present invention, a developer may provide a subclass that declares the data element and a method for creating an accessor.

In 620, a meta model 210 is constructed, for example, by defining a second set of classes. The second set of classes are designed to hold descriptions of properties, objects and semantics. For example, in an exemplary embodiment of the present invention, two semantic interface classes are specified. A first semantic interface class, for example, UMEObjectSemanticI, is the interface for any semantic that affects the creation or destruction of an object. Further, a second semantic interface class, for example, UMEPropertySemanticI, is the interface for any semantic that affects the creation, destruction, or modification of a property. In an exemplary embodiment of the present invention, the implementation of a representation of meta model 210 includes a singleton object that exposes static methods for registering meta data and semantics.

Modeling rules, e.g., semantics 230, may be incorporated into semantic registry 220 of meta model 210 as a predefined set of semantics as in 640 and/or as additional sets of semantics, for example, provided by a developer either upon startup or any time thereafter. In order to incorporate a modeling rule into meta model 210 for an object, the developer subclasses the appropriate calls, for example, UMEObjectSemanticI for a modeling rule for an object and UMEPropertySemanticI for a modeling rule for a property. The developer also could implement a fire method to perform the desired operations and checks upon object/property model 290. A value will be returned to indicate whether the operation was successful. For example, a return value of TRUE would indicate that the operation was successful, and a return value of FALSE would indicate that the operation could not be performed successfully or that the model was in an invalid state. Access points (e.g., object/property model modification points) may also be included in meta model 210 for invoking semantics 230. The various model modification points (e.g., CreateObject) would invoke the respective semantic at the appropriate point. If an indication is received from the firing of semantics that one or more semantics had failed to complete successfully, for example, FALSE, the operation could then abort.

In 630, a type code is associated with the first and second set of classes. A type code is a unique identifier that specifies what type of meta data is being represented. Each item specified in the meta model, both objects and properties, would have a unique type code. In an exemplary embodiment of the present invention, UMA 200 includes a variable type, TypeCode_t, which is declared to hold the type codes. A predefined set of semantics is provided to the semantic registry 220 of meta model 210 in 640.

In 650, a plurality of discrete events, for example, as shown in Table One, are identified. The discrete events indicate occurrences where object/property model 290 may be modified. In an exemplary embodiment of the present invention, each discrete event is assigned a constant to represent it, and a variable type, for example, Event_t, is declared to hold the event constants.

In 660, object/property interface 280 is provided. The object/property interface 280, for example, prevents a developer from directly accessing object/property model 290 and may include limiting the number of code paths by which a developer could modify object/property model 290. For example, if a developer wanted to destroy an object in object/property model 290, a request would have to be made to object/property interface 280 such as UMEObjectI:DestroyObject.

Figure 7:
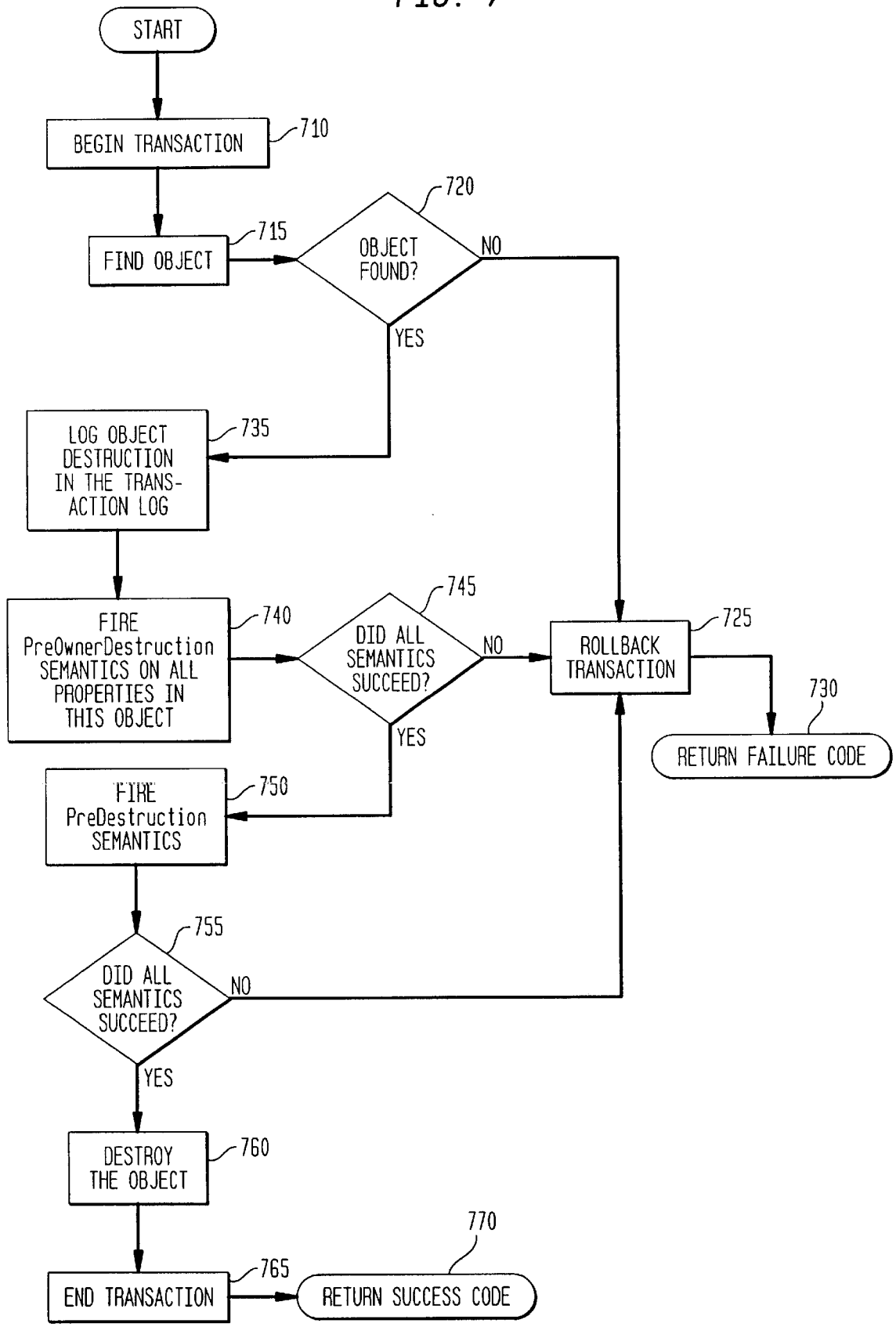
FIG. 7 illustrates a flow diagram of an exemplary embodiment of executing an exemplary function of the present invention.

FIG. 7 shows an exemplary embodiment of object/property interface 280 executing DestroyObject request. As shown in FIG. 7, access to object/property model 290 is limited by object/property interface 280 handling the DestroyObject request. For example, in 710, object/property interface 280 communicates with transaction manager 285 to open a transaction upon receiving a request to destroy an object (e.g., DestroyObject function). In 715, object/property interface 280 communicates with object/property model 290 to find the object requested to be destroyed. In 720, object/property interface 280 determines whether the object was found. If not, in 725, transaction manager 285 rolls back the transaction pursuant to a request by object/property interface 280 and in 730 transaction manager returns a failure code to the calling module, for example, the user interface. If the object is found, however, in 735, object/property interface 280 provides transaction manager 285 with the object destruction information and transaction manager 285 logs the object destruction into transaction log 295. In 740, object/property interface 280 fires the PreOwnerDestruction Semantics on all properties of the respective object. In 745, object/property interface 280 determines whether all semantics succeeded. If not, in 725, transaction manager 285 rolls back the transaction pursuant to a request by object/property interface 280 and 730 and transaction manager 285 returns a failure code to the calling module.

If all the PreOwner Destruction Semantics succeeded, in 750, object/property interface 280 fires the PreDestruction Semantics. In 755, object/property interface 280 determines whether all of the PreDestruction Semantics succeeded. If so, in 760, the object is destroyed, in 765, object/property interface 280 communicates to transaction manager 285 to end transaction, and in 770, 730, transaction manager 285 returns a success code to the calling module. If the PreDestruction Semantics failed, however, in 725, transaction manager 285 rolls back transaction pursuant to a request from object/property interface 280 and 730, and transaction manager 285 returns a failure code to the calling module.

To limit construction and destruction of objects, for example, object constructors and destructors are protected to prevent the developer from directly instantiating or destroying an object. To limit the creation, destruction and modification of properties, for example, the data members of the properties are made private. In an exemplary embodiment of the present invention, UMA 200 includes a class known as an accessor that includes an interface class, for example, UMEAccessorI. The accessor interface class is a friend class to the property and it is through accessors that access is gained to the data members. Accessors are provided with data values and instructions (e.g., "set the value" or "delete the property") and injected into properties. Accessors perform their actions and return a code indicating success or failure. Accessors are constructed by asking the property to provide one. This allows the property to construct an accessor that can handle the data type of the property. All operations on a property are conducted via an accessor, thus any code that the semantics require could be placed in the accessor base class that is supplied. The developer subclassing accessor would simply provide a data element and a way of reading and writing to it. Methods are provided on the accessor base class to allow the binding to a property.

As shown in FIG. 6, in 670, a transaction manager 285 is provided. The transaction manager 285 manages actions of a transaction and if the actions fail, the actions are undone or are wiped out. By starting a transaction at the beginning of a model manipulation, then monitoring the error states of the various semantics, the transaction manager 285 maintains the object/property model 290 in a valid state. In an exemplary embodiment of the present invention, transaction manager 285 records an exact image of object/property model 290 prior to the implementation of a change based on an action. If the action succeeds, the respective change is allowed to stand. If a failure occurs, then transaction manager 285 restores the old image. The transaction manager 285 may incrementally preserve images as the model changes.

As an example, within a single transaction the user is going to create an object and set its name. Upon successful creation of an object, the fact that the object was created and a handle to that object are stored in the transaction log 295. If the user then sets the name of the object to "Customer," the creation of the property is recorded and the old value (nothing) is saved to the log. If the user then sets the name again to "Cust," the old value ("Customer") is saved to the log. If all succeeds, then an object named "Cust" exists. On failure, however, transaction manager 285 will start rolling back: first, changing the name from "Cust" to "Customer"; second, deleting the existence of the name property altogether; and finally, deleting the object. This restores object/property model 290 to the state that existed prior to the performance of the failed transaction.

In an exemplary embodiment of the present invention, the changed objects and properties as a result of an action are provided to object/property model 290 by object/property interface 280. If the semantics involved by the action fail, object/property interface 280 informs transaction manager 285 to undo the action. As a result, object/property model 290 is placed back in the state prior to the changed objects and properties being provided to the object property model 290 from the object/property interface 280 as a result of the failed action.

Figure 8:
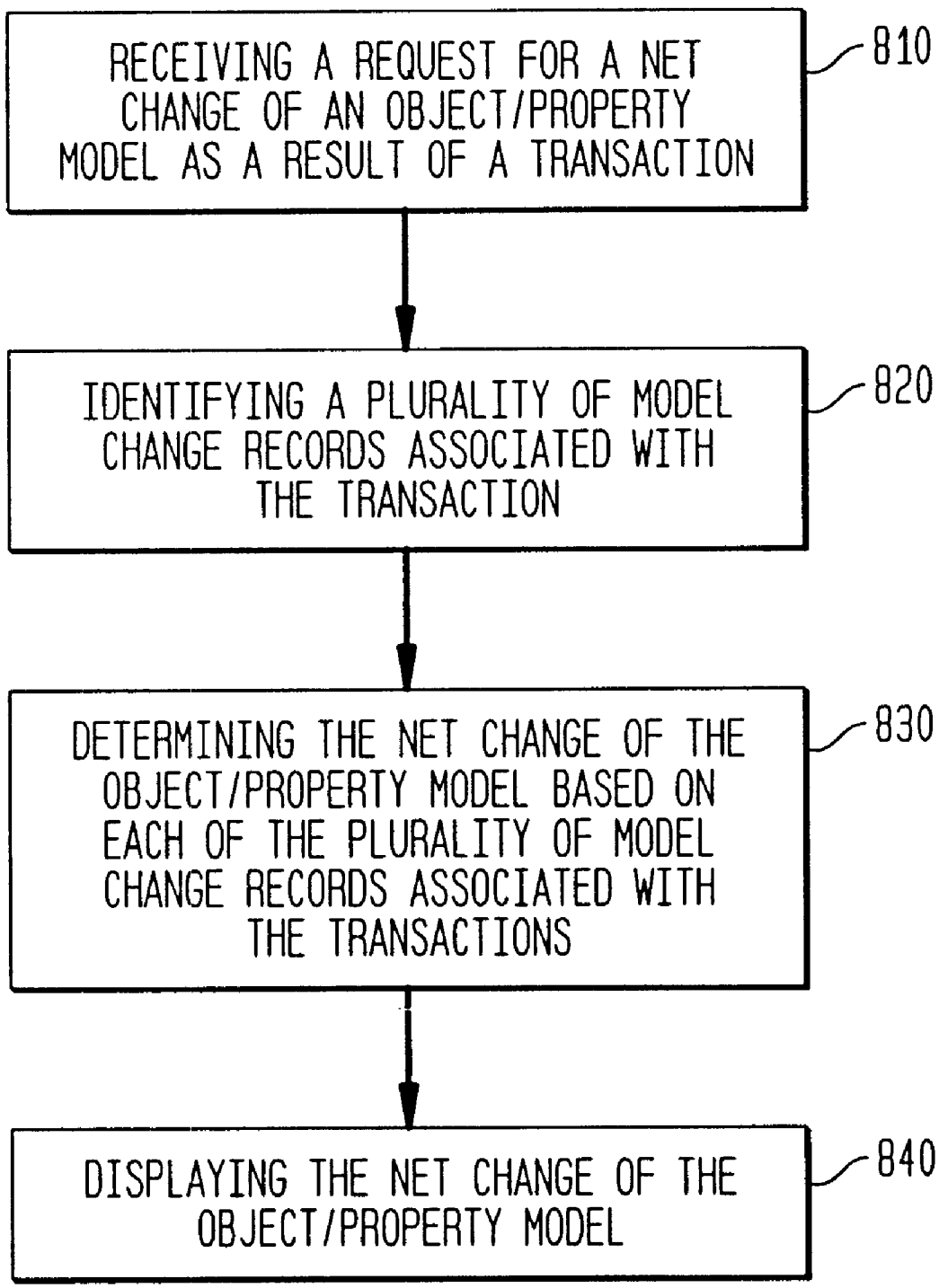
FIG. 8 illustrates a flow diagram of an exemplary embodiment of a method for determining the net change to a model as a result of a transaction of the present invention.

FIG. 8 illustrates a flow diagram of an exemplary embodiment of a method for determining the net change to an object/property model 290 as a result of a transaction of the present invention. In 810, the transaction manager 285, for example, receives a request for a net change of an object/property model 290 as a result of a transaction. The net change of the object/property model 290 as a result of the transaction is, for example, the differences of the object/property model 290 that exist at the end of the transaction compared to the object/property model 290 prior to the beginning of the transaction. In 820, the transaction manager 285 identifies a plurality of model change records associated with the transaction. In 830, the transaction manager 285 determines the net change of the object/property model 290 based on each of the plurality of model change records associated with the transaction. In an exemplary embodiment of the present invention, in 840, the net change of the object/property model 290 may be provided to a requester, such as an UMA-based application 225, by being displayed on a display. The transaction manager 285 may, for example, determine the net change to the object/property model 290 by determining a net action type change for an action of the respective model change record interacting with an object and a net data change for data associated with the object for each of the plurality of model change records of the transaction.

An action type is, for example, a numeric code that identifies an action of a transaction. The net action-type change for an action of the respective model change record is the action-type name determined by a function (e.g., action-type function) of the transaction manager 285, associated with the action of the respective model change record and recorded in the delta location associated with the transaction. In an exemplary embodiment of the present invention, the delta location includes the net action-type change for the object/property model 290 as a result of the transaction upon the completion of the examination by the transaction manager 285 of each of the respective model change records of the transaction.

Data associated with an object is data stored in the delta location that may include the object itself, an image of the object prior to the execution of an action of the respective model change record that interacts with the object (pre-image), an image of the object after the execution of the action of the respective model change record that interacts with the object (post-image), and a property of the object. The net data change for the object is the data determined by a function (e.g., data function) of the transaction manager 285 that is associated with the object interacted upon by the action of the respective model change record and recorded in the delta location associated with the transaction. In an exemplary embodiment of the present invention, the delta location includes the net data change for the object/property model 290 as a result of the transaction upon the completion of the examination by the transaction manager 285 of each of the respective model change records of the transaction.

In an exemplary embodiment of the present invention, the transaction manager 285 identifies the plurality of model change records associated with the transaction by, for example, locating a start position on a transaction log 295 corresponding with the beginning of the transaction and an end position on the transaction log 295 corresponding with the end of the transaction. The transaction manager 285 also identifies each of the plurality of model change records between the start position and the end position.

An UMA-based application may request, for example, the net change of the object/property model 290 as a result of the exemplary DELETE Table A transaction described above. The transaction manager 285 identifies the model change records associated with the DELETE Table A transaction in the transaction log 295 by locating the model change records after the start position and before the end position of the respective transaction. In the exemplary case, the Delete Table A record, the modification of the object containing the respective DML statement record, and the object touching record will be identified. The net change is determined based on these records, for example, by determining the net action type change as described with reference to FIGS. 9 and 10 and the net data change as described with reference to FIGS. 11 and 12. The net change may be provided in, for example, a delta object and the delta object displayed on a display.

Figure 9:
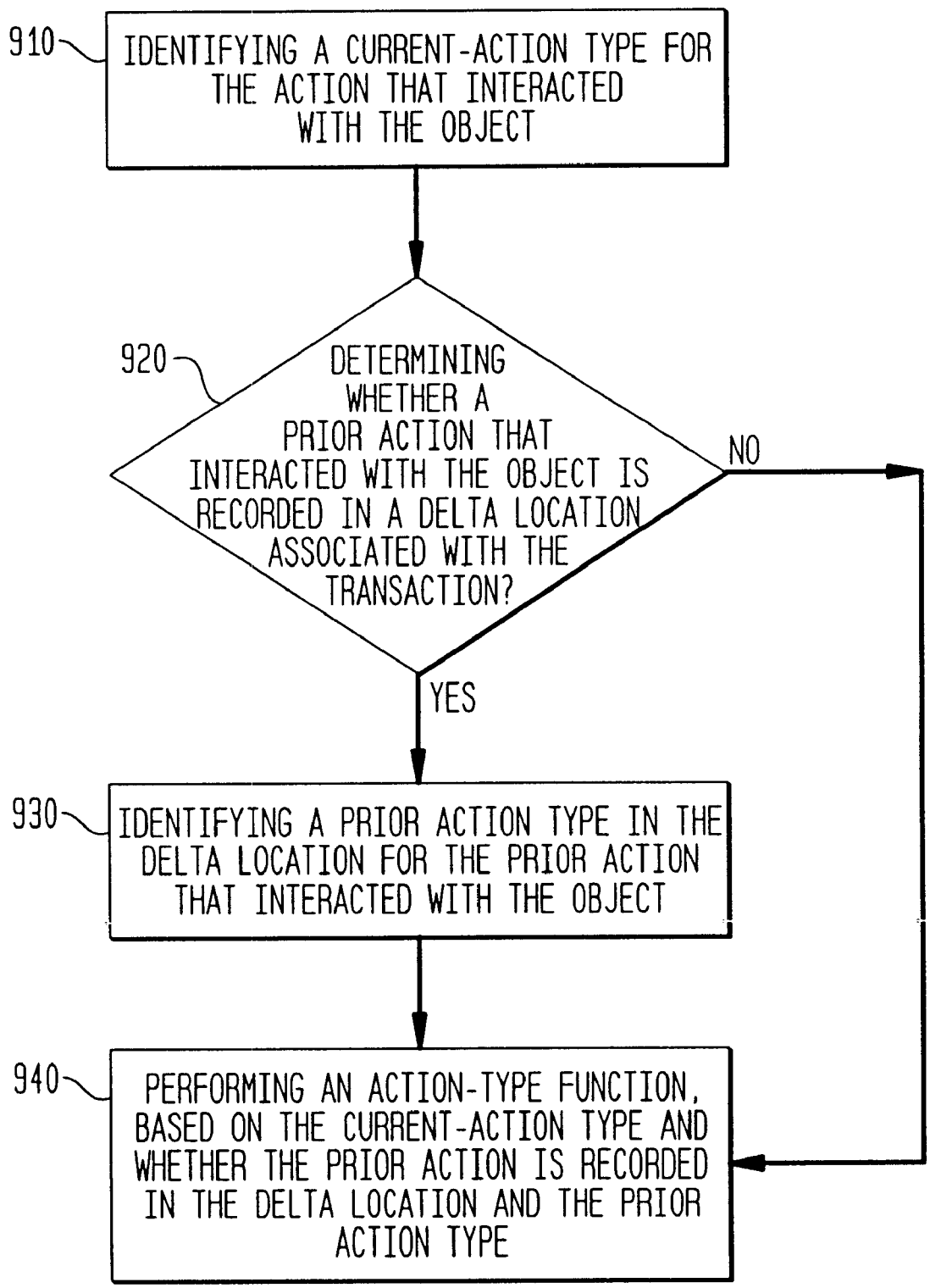
FIG. 9 illustrates a flow diagram of an exemplary embodiment of a method for determining the net action type change from model change records as a result of a transaction of the present invention.

FIG. 9 illustrates a flow diagram of an exemplary embodiment of a method for determining the net action type change from model change records as a result of a transaction of the present invention. In 910, the transaction manager 285 identifies a current-action type for the action of the respective model change record that interacted with the object. The current-action type is an action type associated with the action of the respective model change record of the transaction log file 295 currently being examined by the transaction manager 285. In 920, the transaction manager 285 determines whether a prior action that interacted with the object is recorded in a delta location associated with the transaction. In an exemplary embodiment of the present invention, a unique identification (ID) is provided to each object. Accordingly, the same object in the delta location and a respective model change record can be determined, for example, by the unique ID.

If the prior action that interacted with the object is not recorded in the delta location, the transaction manager 285 proceeds to 940. If, however, the prior action that interacted with the object is recorded in the delta location, in 930, the transaction manager 285 identifies a prior-action type for the prior action, for example, in the delta location. The prior-action type is the action type associated with the prior action. The prior action is an action that interacted with the same object as the action of the model change record currently being examined by the transaction manager 285 prior to the execution of the action of the respective model change record.

In 940, the transaction manager 285 performs an action-type function based on the current-action type, whether the prior action is recorded in the delta location and the prior-action type. The action-type function may include at least one of determining a new action type for the action of the respective model change record, recording the new action type in the delta location, removing the prior-action type from the delta location, maintaining the prior-action type in the delta location, recording the current-action type in the delta location, and recording that the action is invalid in the delta location.

The delta location may be, for example, an object or a file where model change information is stored, for example, for a transaction or plurality of transactions. The contents of the delta location may change as the transaction manager 285 examines each of the model change records of the respective transaction. The contents of the delta location, upon the completion of the examination by the transaction manager 285 of all the respective model changes, results in the net change of the object/property model 290 as a result of the transaction. In an exemplary embodiment of the present invention, the transaction manager 285 repeats 910 through 940 for each model change record of the transaction. In an exemplary embodiment of the present invention, upon completion of all the model change records of the transaction, the contents of the delta location includes the net action type change as a result of the transaction.

FIG. 10 illustrates an exemplary set of rules for determining the net action type change from the model change records of a transaction. In FIG. 10, Column A, Rows b, c, and d include exemplary current-action types (Add, Update, Delete) that may respectively correspond to an action of the respective model change record interacting with an object. Row a, Columns C, D, and E include prior-action types that may be respectively associated with the prior action recorded in the delta location that interacted with the object. Row a, Column B, includes whether the prior action exists in the delta location. Row b, Columns B, C, D, and E; Row c, Columns B, C, D, and E; Row d, Columns B, C, D, and E include an exemplary set of action-type functions that may be performed by the transaction manager 285.

In determining the net action-type change as a result of the exemplary DELETE Table A transaction described above, the transaction manager 285 examines the first model change record (Delete Table A) of the DELETE Table A transaction to identify the current-action type (e.g., one of Add, Update or Delete). As the action is Delete A, the current-action type is delete. The transaction manager 285 determines if a prior action that may have interacted with the object, Table A, is recorded in the delta location associated with the DELETE Table A transaction. Since the delta location is presently empty, the prior action does not exist in the delta location. Thus, referring to FIG. 10, the transaction manager 285 performs an action-type function (Column B, Row d), determining and recording a new action type, delete, for the action, Delete Table A, in the delta location.

This function is based on the current-action type being a delete (Column A, Row d) and the prior action not being recorded in the delta location (Column B, Row a). The transaction manager 285 repeats this analysis, for the remaining two model change records of the DELETE Table A transaction. The contents of the delta location, after the completion of the analysis by the transaction manager 285 of the last model change record, includes the net action-type change to the object/property model 290 as a result of the DELETE Table A transaction.

Figure 11:
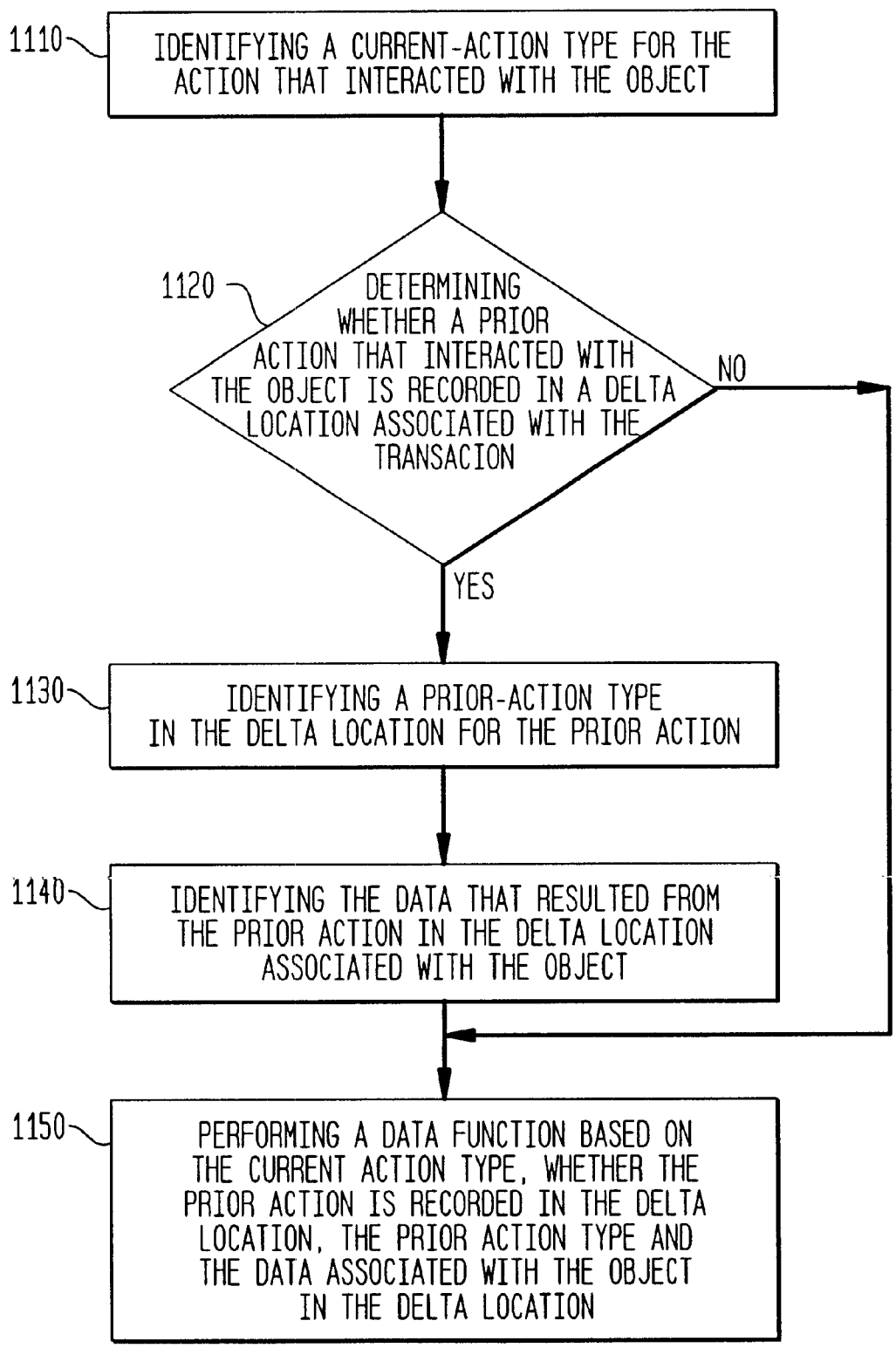
FIG. 11 illustrates a flow diagram of an exemplary embodiment of a method for determining the net data change from model change records as a result of a transaction of the present invention.

FIG. 11 illustrates a flow diagram of an exemplary embodiment of a method for determining the net data change from model change records as a result of a transaction of the present invention. In FIG. 11, the transaction manager 285 determines the net data change for data associated with the object. In 1110, the transaction manager 285 identifies a current-action type for the action of the respective model change record that interacted with the object.

In 1120, the transaction manager 285 determines whether a prior action is recorded in a delta location associated with the transaction. If not, the transaction manager 285 proceeds to 1150. If the prior action is recorded in the delta location, in 1130, the transaction manager 285 identifies a prior-action type in the delta location for the prior action. If the prior action is recorded in the delta location associated with the transaction, in 1140, the transaction manager 285 also identifies data that resulted from the prior action in the delta location associated with the object.

In 1150, the transaction manager 285 performs a data function based on the current-action type, whether the prior action is recorded in the delta location, the prior action type and the data associated with the object in the delta location. The data function may include at least one of removing the data associated with the object from the delta location, recording that the action is invalid in the delta location, replacing the data associated with the object in the delta location, and recording new data corresponding with the object in the delta location.

The new data may include, for example, at least one of a pre-image (an image of the object prior to the execution of the action of the model change record currently being examined) and a post-image (an image of the object after execution of the action of the model change record currently being examined). In an exemplary embodiment of the present invention, the transaction manager 285 repeats 1110 through 1150 for each model change record of the transaction. Upon completion of all the model change records of the transaction, in an exemplary embodiment of the present invention the contents of the delta location includes the net data change as a result of the transaction.

FIG. 12 illustrates an exemplary set of rules for determining the net data change from the model change records of a transaction. In FIG. 12, Column V, Rows w, x, and y include exemplary current-action types (Add, Update, Delete) that may respectively correspond to the action of the respective model change record interacting with an object. Row v, Columns X, Y, and Z include prior-action types that may be respectively associated with the prior action recorded in the delta location that interacted with the object. Row v, Column W, includes whether the prior action that interacted with the object of the respective model change record exists in the delta location. Row w, Columns W, X, Y, and Z; Row x, Columns W, X, Y, and Z; Row y, Columns W, X, Y, and Z include an exemplary set of data functions that may be performed by the transaction manager 285.

In determining the net data change as a result of the exemplary DELETE Table A transaction described above, the transaction manager 285 examines the first model change record (Delete Table A) of the DELETE Table A transaction to identify the current-action type (e.g., one of Add, Update or Delete). As the action is Delete A, the current-action type is delete. The transaction manager 285 determines if a prior action that may have interacted with the object, Table A, is recorded in the delta location associated with the DELETE Table A transaction. No prior action interacting with Table A is determined to exist in the delta location. Thus, referring to FIG. 12, the transaction manager 285 performs a data-type function (Column W, Row y), recording a pre-image, for the action, Delete Table A, in the delta location.

This function is based on the current-action type being a delete (Column V, Row y) and the prior action not being recorded in the delta location (Column W, Row v). The transaction manager performs this analysis for the remaining two model change records of the DELETE Table A transaction. The contents of the delta location, after the completion of the analysis by the transaction manager 285 of the last model change record, includes the net data change to the object/property model 290 as a result of the DELETE Table A transaction.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. A method comprising:
   receiving a request for a net change of a model as a result of a transaction;
   identifying a plurality of model change records associated with the transaction;
   determining the net change of the model based on each of the plurality of model change records associated with the transaction,
   wherein determining the net change of the model includes determining a net action-type change for an action including, for each of the plurality of model change records of the transaction:
   identifying a current-action type for the action of the respective model change record that interacted with an object;
   determining whether a prior action that interacted with the object is recorded in a delta location associated with the transaction and, if so;
   identifying a prior-action type in the delta location for the prior action; and
   performing an action-type function based on the current-action type, whether the prior action is recorded in the delta location and the prior-action type.

2. The method according to claim 1, further comprising:
   displaying the net change of the model.

3. The method according to claim 1, wherein identifying the plurality of model change records associated with the transaction includes:
   locating a start position on a transaction log corresponding with the beginning of the transaction;
   locating an end position on the transaction log corresponding with the end of the transaction; and
   identifying each of the plurality of model change records between the start position and
   the end position.

4. The method according to claim 1, wherein determining the net change to the model includes, for each of the plurality of model change records of the transaction:
   determining a net data change for data associated with the object.

5. The method according to claim 4, wherein determining the net data change for data associated with the object includes, for each of the plurality of model change records of the transaction:
   identifying a current-action type for the action of the respective model change record that interacted with the object;
   determining whether a prior action that interacted with the object is recorded in a delta location associated with the transaction and, if so;
   identifying a prior-action type in the delta location for the prior action;
   identifying the data that resulted from the prior action in the delta location associated with the object; and
   performing a data function based on the current-action type, whether the prior action is recorded in the delta location, the prior action type and the data associated with the object in the delta location.

6. The method according to claim 5, wherein the action-type function includes at least one of removing the data associated with the object from the delta location, recording that the action is invalid in the delta location, replacing the data associated with the object in the delta location, and recording new data corresponding with the object in the delta location.

7. The method according to claim 6, wherein the new data recorded in the delta location is at least one of a pre-image of the object before the execution of the action and a post-image of the object after the execution of the action.

8. The method according to claim 1, wherein the action-type function includes at least one of determining a new action type for the action of the respective model change record, recording the new action type in the delta location, removing the prior-action type from the delta location, maintaining the prior-action type in the delta location, recording the current-action type in the delta location, and recording that the action is invalid in the delta location.

* * * * *